(12) United States Patent
Koyanagi

(10) Patent No.: US 9,318,038 B2
(45) Date of Patent: Apr. 19, 2016

(54) COLOR CONTROL METHOD AND COMMUNICATION APPARATUS

(71) Applicant: HUAWEI DEVICE CO., LTD., Shenzhen (CN)

(72) Inventor: Masahiko Koyanagi, Yokohama (JP)

(73) Assignee: HUAWEI DEVICE CO., LTD., Shenzhen (CN)

( * ) Notice: Subject to any disclaimer, the term of this patent is extended or adjusted under 35 U.S.C. 154(b) by 22 days.

(21) Appl. No.: 14/132,519

(22) Filed: Dec. 18, 2013

(65) Prior Publication Data

US 2014/0104253 A1 Apr. 17, 2014

Related U.S. Application Data

(63) Continuation of application No. PCT/CN2012/077313, filed on Jun. 21, 2012.

(51) Int. Cl.
| | |
|---|---|
| *G09G 5/00* | (2006.01) |
| *G09G 3/20* | (2006.01) |
| *G09G 5/02* | (2006.01) |
| *H04M 1/02* | (2006.01) |

(52) U.S. Cl.
CPC ............... *G09G 3/2003* (2013.01); *G09G 5/02* (2013.01); *H04M 1/0266* (2013.01); *G09G 2320/0666* (2013.01); *G09G 2360/144* (2013.01)

(58) Field of Classification Search
CPC .............. G09G 3/20; G09G 2360/144; G09G 2320/0626; G09G 3/3406; G09G 3/3648; G09G 3/2003; G09G 5/02; G09G 2320/0666; G09G 5/00; H04M 1/02
USPC ........ 345/101, 207, 601, 689–691; 348/223.1
See application file for complete search history.

(56) References Cited

U.S. PATENT DOCUMENTS

| | | |
|---|---|---|
| 2003/0198466 A1 | 10/2003 | Bianchi et al. |
| 2007/0081103 A1 | 4/2007 | Ahn et al. |
| 2009/0040170 A1* | 2/2009 | Nilsson .................. 345/101 |
| 2010/0165002 A1 | 7/2010 | Ahn |

(Continued)

FOREIGN PATENT DOCUMENTS

| | | |
|---|---|---|
| CN | 1949884 | 4/2007 |
| CN | 102394972 | 3/2012 |

(Continued)

OTHER PUBLICATIONS

International Search Report issued on Mar. 28, 2013 in corresponding International Application No. PCT/CN2012/077313.

(Continued)

*Primary Examiner* — Md Saiful A Siddiqui
(74) *Attorney, Agent, or Firm* — Staas & Halsey LLP

(57) ABSTRACT

The embodiments of the present invention provide a color control method and communication apparatus, the color control method includes: acquiring color temperature information of ambient light; calculating a suitable color parameter based on the color temperature information; adjusting display of the communication apparatus according to the suitable color parameter. Through the embodiments of the present invention, the quality of display image can be improved to a higher degree. Furthermore, the communication apparatus can change WB of display dynamically and can provide a way to optimize color to ambient light condition automatically.

17 Claims, 5 Drawing Sheets

(56) References Cited

U.S. PATENT DOCUMENTS

| | | |
|---|---|---|
| 2010/0289811 A1 | 11/2010 | Chen et al. |
| 2012/0262571 A1* | 10/2012 | Wang et al. ............... 348/135 |
| 2012/0262601 A1* | 10/2012 | Choi et al. ............. 348/223.1 |

FOREIGN PATENT DOCUMENTS

| | | |
|---|---|---|
| CN | 102394986 | 3/2012 |
| JP | 2003-209855 | 7/2003 |
| JP | 2003-259392 | 9/2003 |
| JP | 2003-319215 | 11/2003 |
| JP | 2009-204988 | 9/2009 |
| JP | 2011-166491 | 8/2011 |

OTHER PUBLICATIONS

Japanese Office Action dated Jan. 27, 2015 in corresponding Japanese Patent Application No. 2014-520507.

Japanese Office Action dated Sep. 8, 2015 in corresponding Japanese Patent Application No. 2014-520507.

Chinese Office Action and Search Report dated Sep. 11, 2015 in corresponding Chinese Patent Application No. 201280074068.3.

* cited by examiner

| Ambient Light Name | Ambient Color temperature | Display White Balance |
|---|---|---|
| Daylight | 6,500K | Parameter_Set_A |
| Cloudy | 5,500K | Parameter_Set_B |
| Incandescent | 2,000K | Parameter_Set_C |
| Florescent | 5,000K | Parameter_Set_D |
| …… | …… | …… |

| Ambient Brightness | Ambient Color Temperature | | | |
|---|---|---|---|---|
| | 3,000K | 5,000K | 6,500K | 8,000K |
| 0lx | WB_A BR_A1 | WB_B1 BR_B1 | WB_C1 BR_C1 | …… |
| 50lx | WB_A BR_A2 | WB_B2 BR_B2 | WB_C2 BR_C2 | …… |
| 300lx | WB_A BR_A3 | WB_B3 BR_B3 | WB_C3 BR_C3 | …… |
| 1000lx | …… | …… | …… | …… |

COLOR CONTROL METHOD AND COMMUNICATION APPARATUS

CROSS REFERENCE

This application is a continuation of International Application No. PCT/CN2012/077313, filed on Jun. 21, 2012, which is hereby incorporated by reference in its entirety.

FIELD OF THE INVENTION

This application relates to the communication technology and in particular, to a color control method and communication apparatus.

BACKGROUND

In the smartphone industry, the quality of display image is getting more and more important. Since the smartphone is carried by end users anytime and anywhere, the quality of display image under various ambient light conditions is one of key points to make differentiation for devices.

Old or low cost mobile phones usually don't have any way to detect difference of ambient light conditions. In this case, the device has only 1 set of display tuning parameters which is intended to cover all the possible conditions. The way to improve the image quality is to tune the parameters optimized against the worst condition.

However, this way of optimization causes bad side effects: worse image quality in other conditions, increase of power consumption, increase of noise emission, etc.

In order to solve the problem pointed out, recently many smartphone has the capability of automatic control of display brightness. For example, the basic principle is: firstly, detect ambient brightness (illuminance in scientific word); secondly, calculate suitable display brightness; thirdly, change the display brightness.

However, the applicant found that the prior art has following major problem: it cannot control color or white balance dynamically such that the quality of display image is still not good in some conditions.

SUMMARY

Embodiments of the present invention pertain to a color control method and communication apparatus. The aim is to improve the quality of display image to a higher degree.

According to an aspect of the embodiments of the present invention, there is provided a color control method, applied for display in a communication apparatus, the color control method includes:

acquiring color temperature information of ambient light;

calculating a suitable color parameter based on the color temperature information;

adjusting display of the communication apparatus according to the suitable color parameter.

According to another aspect of the embodiments of the present invention, wherein the acquiring color temperature information of ambient light is specifically:

acquiring, by a camera of the communication apparatus, the color temperature information of ambient light.

According to another aspect of the embodiments of the present invention, wherein the acquiring color temperature information of ambient light is specifically:

acquiring, by an AWB (Auto White Balance) function of the camera, the color temperature information of ambient light.

According to another aspect of the embodiments of the present invention, wherein the acquiring color temperature information of ambient light is specifically:

acquiring, by an ISP (Image Signal Processor) of the camera, the color temperature information of ambient light.

According to another aspect of the embodiments of the present invention, wherein the calculating a suitable color parameter based on the color temperature information specifically comprises:

determining the suitable color parameter by looking up the pre-defined table according to the color temperature information; wherein a pre-defined table is configured to map color temperature information to corresponding color parameters.

According to another aspect of the embodiments of the present invention, wherein the color control method further comprising:

acquiring brightness information of ambient light;

calculating a suitable brightness parameter based on the brightness information; and the adjusting display of the communication apparatus according to the suitable color parameters specifically comprises: adjusting display of the communication apparatus according to the suitable color parameter and the suitable brightness parameter.

According to another aspect of the embodiments of the present invention, wherein the acquiring brightness information of ambient light is specifically:

acquiring, by an ambient light sensor of the communication apparatus, the brightness information of ambient light.

According to another aspect of the embodiments of the present invention, wherein the acquiring brightness information of ambient light is specifically:

acquiring, by a camera of the communication apparatus, the brightness information of ambient light.

According to another aspect of the embodiments of the present invention, wherein the acquiring brightness information of ambient light is specifically:

acquiring, by an AE (Auto Exposure) function of the camera, the brightness information of ambient light.

According to another aspect of the embodiments of the present invention, wherein the acquiring brightness information of ambient light is specifically:

acquiring, by an ISP (Image Signal Processor) of the camera, the brightness information of ambient light.

According to another aspect of the embodiments of the present invention, there is provided a communication apparatus, the communication apparatus includes:

a first acquiring device, configured to acquire color temperature information of ambient light;

a processor, configured to calculate a suitable color parameter based on the color temperature information;

a display device, configured to adjust display of the communication apparatus according to the suitable color parameter.

According to another aspect of the embodiments of the present invention, wherein the first acquiring device is a camera.

According to another aspect of the embodiments of the present invention, wherein an AWB (Auto White Balance) function of the camera is configured to acquire color temperature information.

According to another aspect of the embodiments of the present invention, wherein an ISP (Image Signal Processor) of the camera is configured to acquire color temperature information.

According to another aspect of the embodiments of the present invention, wherein the communication apparatus further comprises:

a memory, configured to store a pre-defined table; wherein the pre-defined table is configured to map color temperature information to corresponding color parameters; and the processor is specifically configured to determine the suitable color parameter by looking up the pre-defined table according to the color temperature information.

According to another aspect of the embodiments of the present invention, wherein the communication apparatus further comprising:

a second acquiring device, configured to acquire brightness information of ambient light;

the processor is further configured to calculate a suitable brightness parameter based on the brightness information; and the display device is further configured to adjust display of the communication apparatus according to the suitable color parameter and the suitable brightness parameter.

According to another aspect of the embodiments of the present invention, wherein the second acquiring device is an ambient light sensor.

According to another aspect of the embodiments of the present invention, wherein the second acquiring device is a camera.

According to another aspect of the embodiments of the present invention, wherein an AE (Auto Exposure) function of the camera is configured to acquire brightness information.

According to another aspect of the embodiments of the present invention, wherein an ISP (Image Signal Processor) of the camera is configured to acquire brightness information.

According to another aspect of the embodiments of the present invention, there is provided a computer-readable program, wherein when the program is executed in a communication apparatus, the program enables the computer to carry out the color control method.

According to another aspect of the embodiments of the present invention, there is provided a storage medium in which a computer-readable program is stored, wherein the computer-readable program enables the computer to carry out the color control method.

The advantages of the present invention exist in that: through acquiring color temperature information of ambient light, calculating suitable color parameter and adjusting display of the communication apparatus; the quality of display image is improved to a higher degree.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWING

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings.

DETAILED DESCRIPTION

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The preferred embodiments of the present invention are described as follows in reference to the drawings.

Figure 1:
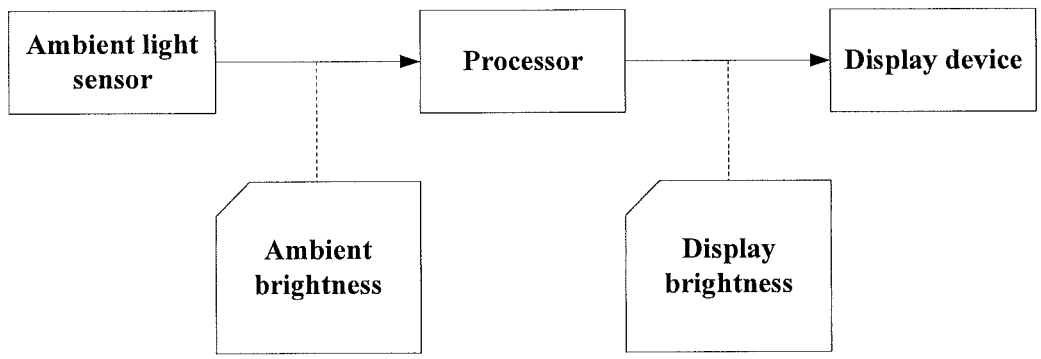
FIG. 1 is a block diagram of a communication apparatus in the prior art.

FIG. 1 is a block diagram of a communication apparatus in the prior art, as shown in FIG. 1, there are an ALS (Ambient Light Sensor), a processor and a display device. The ambient light sensor is used to detect brightness of ambient light.

Different ambient condition has different brightness. For example, Sunlight in daytime is more than 100,000 lx, cloudy sunlight is around 30,000 lx, office with fluorescent light is 500-1,000 lx, small room with candle light is less than 20 lx, etc. The ambient light sensor detects them.

As shown in FIG. 1, the detected ambient brightness is used by the processor to calculate suitable display brightness. Most common implementation is that the processor has pre-defined table which maps ambient brightness to proper display brightness. Then the calculated display brightness is set to display accordingly.

If user carries the smartphone under shiny sunlight, display brightness is set as maximum brightness by the prior art technology to increase contrast of the display image quality. If the smartphone is put in dark condition, it will control the display brightness as smaller value based on the detected ambient brightness. This can also help to reduce power consumption.

However, the prior art has following major problem: it cannot control color or white balance dynamically.

Embodiment 1

This embodiment of the present invention provides a color control method, applied for display in a communication apparatus.

Figure 2:
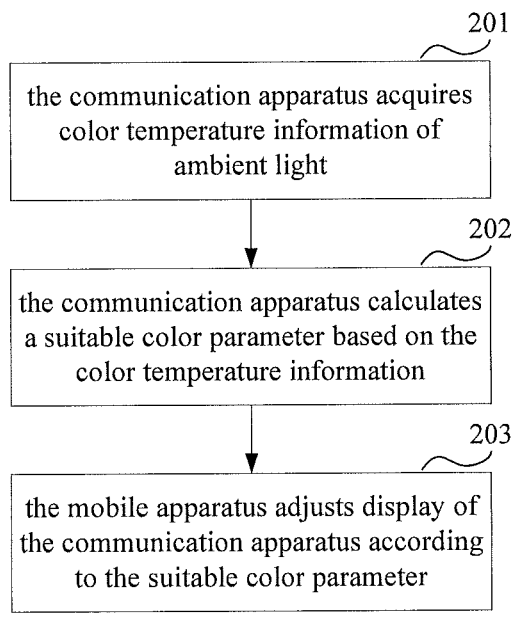
FIG. 2 is a flowchart of the method of an embodiment of the present invention.

FIG. 2 is a flowchart of the method of an embodiment of the present invention. As shown in FIG. 2, the method includes:

Step 201, the communication apparatus acquires color temperature information of ambient light;

Step 202, the communication apparatus calculates a suitable color parameter based on the color temperature information;

Step 203, the communication apparatus adjusts display of the communication apparatus according to the suitable color parameter.

In this embodiment, the communication apparatus may be a mobile apparatus. For example, it may be a smartphone. However, it is not limited thereto, and particular device may be determined as actually required.

In this embodiment, color may be optimized against ambient light condition. Every ambient light has different color temperature. For example, fine clear sky has 12,000K, cloudy is 6,500K, average noon time sunlight is 5,500K, sunset light is 2,000K, fluorescent light is 5,000-6,500K, bulb light is 3,000K, candle light is 2,000K, and so on.

Then, human eye system has capability to control color sensitivity against ambient color. It is called chromatic adaptation. For example, red color sensitivity of eyes will decrease under low color temperature light (which is usually reddish light like bulb or sunset). Because of this mechanism, white color looks a bit bluish under low color temperature light. If we can change white balance of display to a bit more reddish, user can see more natural color reproduction on the display (white looks more white than before). The same story can apply to the higher color temperature case too. However, the prior art does not have this feature.

In this embodiment, a camera may be used to acquire color temperature information of ambient light. The camera may be a normal camera which usually used to take photo or record video clips.

Commonly, smartphones have camera and most feature phone also have one. Some advanced phones may have two cameras. In this case, the "front camera" (a camera which located in the same side of display) is used in the following embodiments of the present invention, but the present invention is not limited thereto.

In this embodiment, the step 202 may be performed by a processor and the processor may be the main processor which runs operating system and controls camera and display.

In this embodiment, the step 203 may be performed by a display device and the display device may be the component which shows visual data to users. LCD (Liquid Crystal Display) or OLED (Organic Light Emitting Diode) technology is commonly used to realize display for communication devices.

In a scenario, the AWB (Auto White Balance) function of the camera may be used to acquire color temperature information. Mobile camera has AWB function which senses color temperature of ambient light and correct white balance automatically for photo. The processor can read the color temperature information of ambient light from camera.

In another scenario, the ISP (Image Signal Processor) of the camera may be used to acquire color temperature information. The ISP is a part of camera system and the processor can read the color temperature information of ambient light from the ISP.

In this embodiment, actual data structure of the ambient color temperature depends on the implementation but most cases it has to several pre-defined light source names. For example: Daylight, Cloudy, Incandescent, Fluorescent, etc.

In implement, a pre-defined table may be included in the communication apparatus and the pre-defined table maps the color temperature information to the suitable color parameters; and step 202 may specifically include: determining the suitable color parameters based on the pre-defined table.

Figures 3, 4:
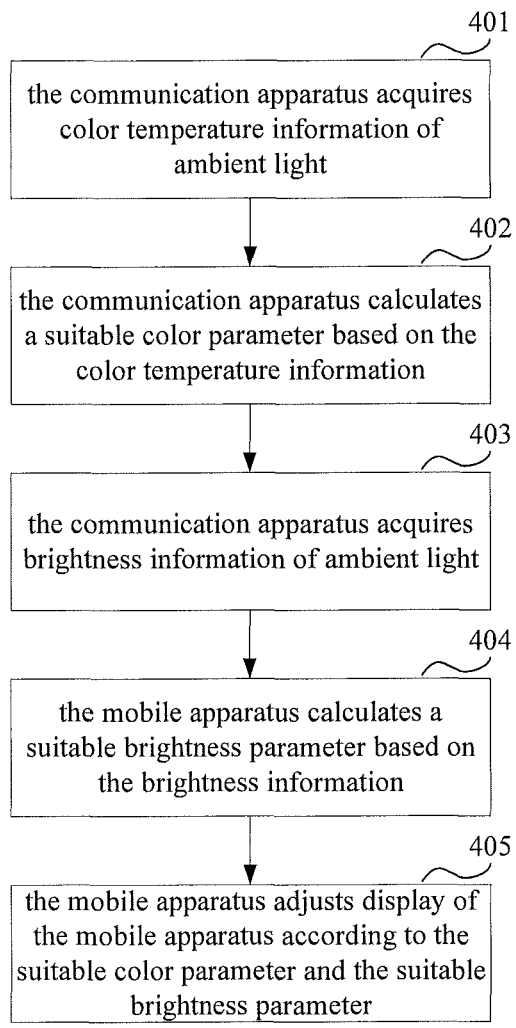
FIG. 3 is an example of the pre-defined table.
FIG. 4 is another flowchart of the method of an embodiment of the present invention.

FIG. 3 is an example of the pre-defined table. As shown in FIG. 3, the pre-defined table maps ambient color temperature to display white balance settings. Usually white balance setting is a set of parameters or register setting. It's also designed in the product development of the mobile phone.

After determined the proper WB (Whit Balance) setting for display based on the input from camera, the processor changes display WB by setting the new parameter to the display.

It can be seen from the above embodiment that through acquiring color temperature information of ambient light, calculating suitable color parameters and adjusting display of the communication apparatus; the quality of display image is improved to a higher degree. Furthermore, the communication apparatus can change WB of display dynamically and can provide a way to optimize color to ambient light condition automatically.

Embodiment 2

Based on the embodiment 1, this embodiment of the present invention further provides a color control method, applied for display in a communication apparatus. The same content will not be described.

FIG. 4 is another flowchart of the method of an embodiment of the present invention. As shown in FIG. 4, the method includes:

Step 401, the communication apparatus acquires color temperature information of ambient light;

Step 402, the communication apparatus calculates a suitable color parameter based on the color temperature information;

Step 403, the communication apparatus acquires brightness information of ambient light;

Step 404, the communication apparatus calculates a suitable brightness parameter based on the brightness information;

Step 405, the communication apparatus adjusts display of the communication apparatus according to the suitable color parameter and the suitable brightness parameter.

In this embodiment, a camera may be used to acquire color temperature information of ambient light in step 401 and the step 402 may be performed by a processor.

In a scenario, an ambient light sensor may be used to acquire brightness information of ambient light in step 403 and the step 404 may be performed by the processor.

In this scenario, the communication apparatus may equip a camera, an ambient light sensor, a processor and a display device. The ambient light sensor is the sensor device which detects brightness of ambient light. The output value of the ambient light sensor usually corresponds to the ambient brightness.

In addition to the embodiment 1, this scenario can have more optimized control of display image quality against ambient light condition. In many studies done for human vision, it is known that if the ambient brightness is bigger it's better to have a bit higher color temperature than the dark brightness condition. In order to cover this issue, this scenario uses ambient brightness information from the ambient light sensor to determine optimized WB and brightness of the display.

In this scenario, the communication apparatus can achieve further better display quality optimization by using brightness information derived from an ambient light sensor.

In another scenario, a camera is used to acquire brightness information of ambient light in step 403 and the step 404 may be performed by the processor. This camera of step 401 and the camera of step 403 may be the same one.

In this scenario, the communication apparatus may equip a camera, a processor and a display device. In this case, not only color to temperature but also brightness information can be got from the camera.

In this scenario, the AE (Auto Exposure) function of the camera may be used to acquire brightness information; or the ISP (Image Signal Processor) of the camera may be used to acquire brightness information. However, it is not limited thereto, and particular manner may be determined as actually required.

Mobile camera has AE (Auto Exposure) function which controls exposure automatically for photo. In order to determine propose exposure value, the camera system first analyze the ambient brightness. The processor can read the brightness information of ambient light from camera or ISP.

In this scenario, an ambient light sensor doesn't have to be used to get ambient brightness. The communication apparatus can achieve similar level of display image quality without introducing an ambient light sensor as extra component.

In this embodiment, actual data structure of the ambient brightness depends on the implementation but most cases it has several pre-defined exposure values.

Figures 5, 6:
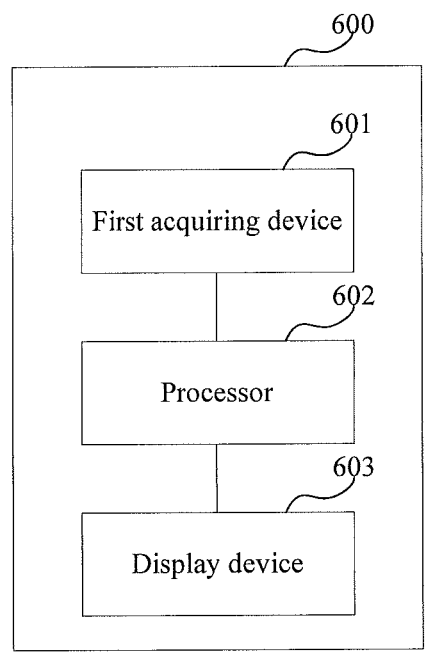
FIG. 5 shows an example of another pre-defined table.
FIG. 6 is a schematic diagram of the communication apparatus of an embodiment of the present invention.

In implement, another pre-defined table may be included in the communication apparatus. FIG. 5 shows an example of another pre-defined table. As shown in FIG. 5, WB_xx shows a parameter set for WB setting, BR_xx shows a parameter set of brightness setting for display.

As for WB setting, if the ambient color temperature is low like 3,000K, it can use a common parameter set WB_A for every ambient brightness conditions. However, if the ambient color temperature is high like 6,500K, it's better to have different parameters for different ambient brightness. Intermediate ambient color temperature can have intermediate optimization of the parameter.

It can be seen from the above embodiment that through acquiring color temperature information of ambient light, calculating suitable color parameters and adjusting display of the communication apparatus; the quality of display image is improved to a higher degree. Furthermore, the communication apparatus can change WB of display dynamically and can provide a way to optimize color to ambient light condition automatically.

Embodiment 3

This embodiment of the present invention further provides a communication apparatus. This embodiment corresponds to the method of the above embodiment 1 and the same content will not be described.

FIG. 6 is a schematic diagram of the communication apparatus of an embodiment of the present invention. Other parts of the communication apparatus can refer to the existing technology and not be described in the present application.

As shown in FIG. 6, the communication apparatus 600 includes: a first acquiring device 601, a processor 602 and a display device 603;

Wherein the first acquiring device 601 is used to acquire color temperature information of ambient light; the processor 602 is used to calculate a suitable color parameter based on the color temperature information; the display device 603 is used to adjust display of the communication apparatus according to the suitable color parameter.

In this embodiment, the first acquiring device 601 may be a camera and the camera is used to acquire color temperature information of ambient light.

In an implement way, the AWB (Auto White Balance) function of the camera may be used to acquire color temperature information. In another implement way, the ISP (Image Signal Processor) of the camera may be used to acquire color temperature information. However, it is not limited thereto, and particular manner may be determined as actually required.

In this embodiment, a pre-defined table mapping the color temperature information to the suitable color parameters may be included in the communication apparatus; and the processor 602 is specifically used to determine the suitable color parameter based on the pre-defined table.

It can be seen from the above embodiment that through acquiring color temperature information of ambient light, calculating suitable color parameters and adjusting display of the communication apparatus; the quality of display image is improved to a higher degree. Furthermore, the communication apparatus can change WB of display dynamically and can provide a way to optimize color to ambient light condition automatically.

Embodiment 4

This embodiment of the present invention further provides a communication apparatus. This embodiment corresponds to the method of the above embodiment 2 and the same content will not be described.

Figure 7:
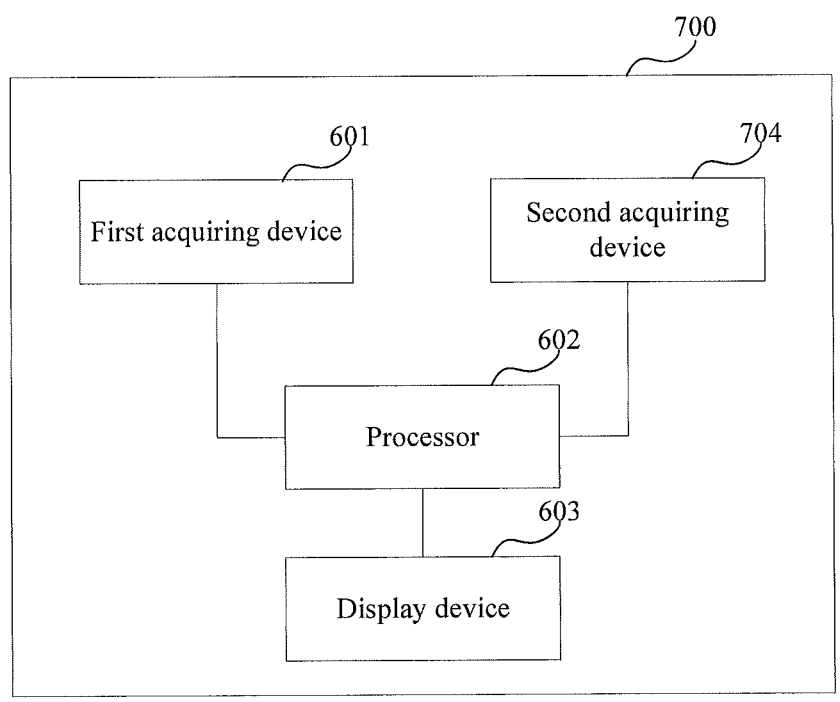
FIG. 7 is a schematic diagram of the communication apparatus of another embodiment of the present invention.

FIG. 7 is a schematic diagram of the communication apparatus of another embodiment of the present invention. Other parts of the communication apparatus can refer to the existing technology and not be described in the present application.

As shown in FIG. 7, the communication apparatus 700 includes: a first acquiring device 601, a processor 602 and a display device 603, as described in embodiment 3.

As shown in FIG. 7, the communication apparatus further includes: a second acquiring device 704; the second acquiring device 704 is used to acquire brightness information of ambient light;

Furthermore, the processor 602 is further used to calculate a suitable brightness parameter based on the brightness information; and the display device 603 is further used to adjust display of the communication apparatus according to the suitable color parameter and the suitable brightness parameter.

In an implement way, the second acquiring device 704 may be an ambient light sensor and the ambient light sensor is used to acquire brightness information of ambient light.

In this case, the communication apparatus may equip a camera, an ambient light sensor, a processor and a display device. The communication apparatus can achieve further better display quality optimization by using brightness information derived from an ambient light sensor.

In another implement way, the second acquiring device 704 may be a camera and the camera is used to acquire brightness information of ambient light.

In implement, the functions of the first acquiring device 601 and the second acquiring device 704 are realized by a camera. The communication apparatus may equip a camera, a processor and a display device.

Figure 8:
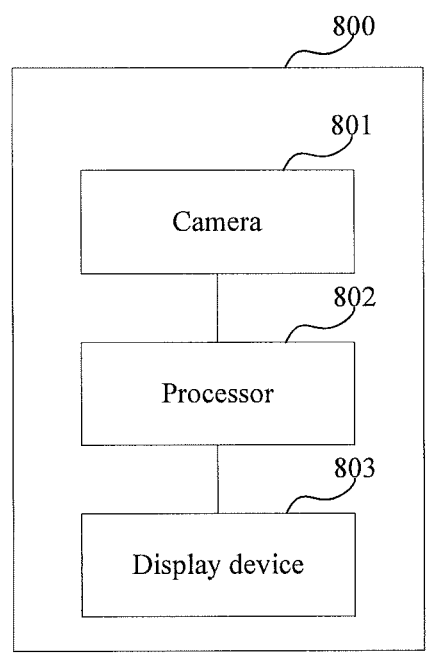
FIG. 8 is a schematic diagram of the communication apparatus of another embodiment of the present invention.

FIG. 8 is another schematic diagram of the communication apparatus of an embodiment of the present invention. As shown in FIG. 8, the communication apparatus 800 includes: a camera 801, a processor 802 and a display device 803.

In this embodiment, the AE (Auto Exposure) function of the camera 801 may be used to acquire brightness information. Or the ISP (Image Signal Processor) of the camera 801 may be used to acquire brightness information. However, it is not limited thereto, and particular manner may be determined as actually required.

In this case, not only color temperature but also brightness information can be got from the camera. The communication apparatus can achieve similar level of display image quality without introducing an ambient light sensor as extra component.

It can be seen from the above embodiment that through acquiring color temperature information of ambient light, calculating suitable color parameter and adjusting display of the communication apparatus; the quality of display image is improved to a higher degree. Furthermore, the communication apparatus can change WB of display dynamically and can provide a way to optimize color to ambient light condition automatically.

The embodiments of the present invention further provide a computer-readable program, wherein when the program is executed in a communication apparatus; the program enables the computer to carry out the color control method.

The embodiments of the present invention further provide a storage medium in which a computer-readable program is stored, wherein the computer-readable program enables the computer to carry out the color control method.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. A color control method, applied to a display of a communication apparatus, the color control method comprising:
    acquiring color temperature information of ambient light;
    calculating a color parameter based on the color temperature information;
    controlling parameter information of the display to adjust intensity of color of the display and temperature setting of the color of the display of the communication apparatus according to the color parameter calculated;

wherein the color control method further comprising:
acquiring brightness information of ambient light,
calculating a brightness parameter for the intensity of color of the display based on the brightness information, and
wherein the display of the communication apparatus is adjusted according to the color parameter and the brightness parameter, and
wherein the acquiring of the brightness information of ambient light includes:
acquiring, by an ambient light sensor of the communication apparatus, the brightness information of ambient light.

2. The color control method according to claim 1, wherein the acquiring of the color temperature information of ambient light includes:
acquiring, by a camera of the communication apparatus, the color temperature information of ambient light.

3. The color control method according to claim 2, wherein the acquiring of the color temperature information of ambient light includes:
acquiring, by an Auto White Balance (AWB) function of the camera, the color temperature information of ambient light.

4. The color control method according to claim 2, wherein the acquiring of the color temperature information of ambient light includes:
acquiring, by an Image Signal Processor (ISP) of the camera, the color temperature information of ambient light.

5. The color control method according to claim 1, wherein the calculating of the color parameter based on the color temperature information comprises:
determining the color parameter by looking up a pre-defined table according to the color temperature information,
wherein the pre-defined table is configured to map color temperature information to corresponding color parameters.

6. The color control method according to claim 1, wherein the acquiring of the brightness information of ambient light includes:
acquiring, by a camera of the communication apparatus, the brightness information of ambient light.

7. The color control method according to claim 6, wherein the acquiring of the brightness information of ambient light includes:
acquiring, by an Auto Exposure (AE) function of the camera, the brightness information of ambient light.

8. The color control method according to claim 6, wherein the acquiring of the brightness information of ambient light includes:
acquiring, by an Image Signal Processor (ISP) of the camera, the brightness information of ambient light.

9. A non-transitory computer-readable program, wherein when the program is executed in a communication apparatus, the program enables a computer to carry out the method as claimed in claim 1 in the communication apparatus.

10. A non-transitory storage medium in which a computer-readable program is stored, wherein the computer-readable program enables a computer to carry out the method as claimed in claim 1 in the communication apparatus.

11. A communication apparatus, the communication apparatus comprising:
a first acquiring device configured to acquire color temperature information of ambient light;
a processor configured to calculate a color parameter based on the color temperature information and control parameter information of the display device;
a display device configured to adjust intensity of color and temperature setting according to the parameter information based on the color parameter calculated by the processor; and
a second acquiring device, configured to acquire brightness information of ambient light,
wherein the processor is further configured to calculate a brightness parameter for the intensity of the color of the display device based on the brightness information, and the display device is further configured to adjust display of the communication apparatus according to the color parameter and the brightness parameter.

12. The communication apparatus according to claim 11, wherein the first acquiring device is a camera.

13. The communication apparatus according to claim 12, wherein the camera is configured to acquire the color temperature information by an Auto White Balance (AWB) function of the camera.

14. The communication apparatus according to claim 12, wherein the camera is configured to acquire the color temperature information by an Image Signal Processor (ISP) of the camera.

15. The communication apparatus according to claim 11, wherein the communication apparatus further comprises:
a memory configured to store a pre-defined table,
wherein the pre-defined table is configured to map color temperature information to corresponding color parameters; and
the processor is configured to determine the color parameter by looking up the pre-defined table according to the color temperature information.

16. The communication apparatus according to claim 11, wherein the communication apparatus is a mobile device.

17. The communication apparatus according to claim 11, wherein the communication apparatus is a smart phone.

* * * * *